(12) United States Patent  (10) Patent No.: US 12,477,969 B2
Kaufmann  (45) Date of Patent: Nov. 25, 2025

(54) AUTOMATIC MANEUVERING OF AN AGRICULTURAL VEHICLE AT A FARMYARD

(71) Applicant: AGCO International GmbH, Neuhausen (CH)

(72) Inventor: Oliver Kaufmann, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 290 days.

(21) Appl. No.: 18/246,065

(22) PCT Filed: Jul. 27, 2021

(86) PCT No.: PCT/IB2021/056807
§ 371 (c)(1),
(2) Date: Mar. 21, 2023

(87) PCT Pub. No.: WO2022/090815
PCT Pub. Date: May 5, 2022

(65) Prior Publication Data
US 2023/0363302 A1  Nov. 16, 2023

(30) Foreign Application Priority Data
Oct. 30, 2020  (GB) ..................... 2017236

(51) Int. Cl.
*A01B 69/04*  (2006.01)
*E05F 15/70*  (2015.01)

(52) U.S. Cl.
CPC .......... *A01B 69/008* (2013.01); *E05F 15/70* (2015.01); *E05Y 2900/106* (2013.01)

(58) Field of Classification Search
CPC ..... A01B 69/008; A01B 69/001; E05F 15/70; E05Y 2900/106; B60W 2300/15; B60W 30/10; B60W 40/02; G05D 1/0212; G05D 1/0223
See application file for complete search history.

(56) References Cited

U.S. PATENT DOCUMENTS 4,558,760 A * 12/1985 Lestradet ............. G05D 1/0219
172/26
4,706,773 A * 11/1987 Reinaud ............... A01B 69/001
180/169
4,967,362 A * 10/1990 Schutten .............. G05D 1/0227
701/50

(Continued)

OTHER PUBLICATIONS

European Patent Office, International Search Report related to International Patent Application No. PCT/IB2021/056807, mail date Oct. 22, 2021, 13 pages.

(Continued)

*Primary Examiner* — Mussa A Shaawat

(57) ABSTRACT

A method for automatically manoeuvring an agricultural vehicle to at least a predefined path segment at a farmyard comprising the steps of gathering all predefined path segments at the farmyard, determining all predefined path segments being free from an obstacle, selecting a free path segment from the predefined path segments being free from an obstacle and calculating a path from the position of the agricultural vehicle to the selected free path segment.

15 Claims, 3 Drawing Sheets

(56) References Cited

U.S. PATENT DOCUMENTS

| | | | | |
|---|---|---|---|---|
| 5,375,059 | A * | 12/1994 | Kyrtsos | G01S 19/11 701/470 |
| 5,955,973 | A * | 9/1999 | Anderson | G01C 21/20 340/995.25 |
| 5,987,383 | A * | 11/1999 | Keller | A01B 79/005 701/50 |
| 5,991,694 | A * | 11/1999 | Gudat | A01B 79/005 701/50 |
| 6,236,916 | B1 * | 5/2001 | Staub | G05D 1/0278 701/28 |
| 6,314,348 | B1 * | 11/2001 | Winslow | B62D 1/286 701/41 |
| 6,732,024 | B2 * | 5/2004 | Wilhelm Rekow | G05D 1/0295 73/178 R |
| 6,876,920 | B1 * | 4/2005 | Mailer | A01B 69/00 701/470 |
| 10,152,891 | B2 * | 12/2018 | Rusciolelli | G05D 1/0088 |
| 10,251,329 | B2 * | 4/2019 | Foster | G05D 1/0219 |
| 11,209,824 | B1 * | 12/2021 | Kingman | B60W 30/09 |
| 2005/0228585 | A1 * | 10/2005 | Pickett | G01C 15/00 701/409 |
| 2006/0178820 | A1 * | 8/2006 | Eglington | A01B 69/008 701/50 |
| 2007/0050117 | A1 * | 3/2007 | Kitzler | A01B 69/008 701/41 |
| 2007/0168116 | A1 * | 7/2007 | Meyer zu Helligen | A01B 69/008 701/50 |
| 2008/0103694 | A1 * | 5/2008 | Dix | A01B 69/008 701/425 |
| 2008/0249692 | A1 * | 10/2008 | Dix | A01B 69/008 701/50 |
| 2009/0265098 | A1 * | 10/2009 | Dix | G05D 1/0278 701/23 |
| 2010/0018726 | A1 * | 1/2010 | Chiocco | G05D 1/0278 172/1 |
| 2014/0172225 | A1 * | 6/2014 | Matthews | G05D 1/0223 701/25 |
| 2015/0331423 | A1 * | 11/2015 | Volger | G05D 1/6484 701/25 |
| 2017/0280614 | A1 * | 10/2017 | Turpin | G06Q 10/0633 |
| 2017/0311534 | A1 * | 11/2017 | Rusciolelli | A01B 79/005 |
| 2018/0321682 | A1 * | 11/2018 | Matsumoto | G01S 19/45 |
| 2019/0141878 | A1 * | 5/2019 | Foster | G05D 1/0217 701/26 |
| 2020/0097021 | A1 | 3/2020 | Carpenter et al. | |
| 2020/0288625 | A1 * | 9/2020 | Pilzweger | A01B 69/008 |
| 2022/0408684 | A1 * | 12/2022 | Brink | G05D 1/644 |

OTHER PUBLICATIONS

UK Intellectual Property Office, Search report for related UK Application No. GB2017236.7, dated Apr. 15, 2021, 3 pages.

* cited by examiner

AUTOMATIC MANEUVERING OF AN AGRICULTURAL VEHICLE AT A FARMYARD

CROSS-REFERENCE TO RELATED APPLICATIONS

This application is a national phase entry under 35 U.S.C. § 371 of International Patent Application PCT/IB2021/056807, filed Jul. 27, 2021, designating the United States of America and published in English as International Patent Publication WO 2022/090815 A1 on May 5, 2022, which claims the benefit of the filing date of the United Kingdom Provisional Patent Application 2017236.7 "Farmyard Machine Automation," filed Oct. 30, 2020, the entire disclosure of which is incorporated herein by reference.

FIELD OF THE INVENTION

The invention relates to a guidance system for agricultural vehicles to manoeuver the agricultural vehicle automatically at a farmyard.

BACKGROUND

EP 1 862 050 B1 discloses an agricultural vehicle connected with an implement (see FIG. 1). When the vehicle parks the implement and decouples from it (automatically), then a path is created and stored by a control device of the vehicle. The path indicates the position of the implement that can be used by the vehicle for coupling automatically with the implement at a later time (see FIG. 3). Thus, it is only possible to automate a coupling process between the vehicle and the implement after the path was created in a decoupling process; but the method is not applicable to automate a parking processes with a subsequent de-coupling process. If an operator wants to park and decouple an implement at his farmyard, the operator has to find a free parking space not blocked by an obstacle manually and to manoeuver the vehicle to this parking space manually.

SUMMARY OF THE INVENTION

It is an objective of the invention to enhance the degree of automatization at a farmyard. The invention helps a farmer or an operator of an agricultural machine to reduce the effort for complex turning manoeuvers, (de-) coupling processes, (un-) loading processes and parking processes at the farmyard. The automatization of typical and recurring activities needed for operations at the farmyard saves operation time and improves safety at work, e.g. reducing the probability of a collision with the agricultural vehicles and implements.

The invention is directed to a method for automatically manoeuvring an agricultural vehicle to at least a predefined path segment at a farmyard according to the claims 1 to 14 and a data processing system comprising at least a means for carrying out the method according to claim 15.

The data processing system can comprise an electronic control unit (ECU) or a network of at least two ECUs for carrying out the method. An ECU can be installed in a vehicle as well as in a stationary computer so that broadly speaking, the vehicle as well as the computer can be part of the network.

The method can be implemented in a computer program product and can be stored on a computer readable medium as e.g. a portable memory card or a cloud storage or computer server. In case of a network of at least two ECUs carrying out the method, individual steps of the method can be executed by different ECUs, whereas an output of an individual step executed by the one ECU can be transferred to the other ECU via the network so that the output can be used as input for another step to be executed by the other ECU.

An agricultural vehicle comprises an ECU for executing the method. The agricultural vehicle can be a tractor, a harvester, a sprayer or any other vehicle that can operate at the farmyard. The agricultural vehicle can be connected with different implements. It is possible that a first implement is connected at a front side of the vehicle and a second implement is connected to the back side of the vehicle. Each implement can be of a different type as a transport wagon, a slicer, a front or back weight, a baler, a seeder, a twister or any other tool.

The ECU of the agricultural vehicle can communicate with a computer server comprising an ECU that is located at the farmyard. Both ECUs can be part of a network to mutually carry out the method.

When the method is executed, the agricultural vehicle can automatically manoeuver to at least a predefined path segment at the farmyard. The method comprises the steps of gathering all predefined path segments at the farmyard, determining all predefined path segments being free from an obstacle, selecting a free path segment from the predefined path segments being free from an obstacle, and calculating a path from the position of the agricultural vehicle to the selected free path segment.

Hence, the agricultural vehicle together with an optional implement can autonomously manoeuver to the path segment without a human interaction. It will be detected if a path segment is blocked by an obstacle as e.g. another vehicle or implement parking at the farmyard. The information of whether a path segment is blocked by an obstacle (or not) can be stored in a memory of the agricultural vehicle. Alternatively, the agricultural vehicle can receive the information from the server or any other vehicle being connected to the network. To avoid a collision with that obstacle, a different path segment is selected to which the agricultural vehicle can be guided.

At least a task to be executed at the selected free path segment can be defined. The task can comprise at least a command to park the agricultural vehicle, to park an implement connected to the agricultural vehicle or to refill the agricultural vehicle with energy or supplies. But also other commands are possible to (de-) couple an implement from/to the agricultural vehicle, to (un-) load the vehicle or the implement, to transfer data between the ECU of the agricultural vehicle and the computer server, to save information recorded by the agricultural vehicle or the implement, etc. A list of several tasks can be displayed on a terminal of the agricultural vehicle and the operator selects the tasks to be executed. Alternatively, the tasks can be predefined by the operator and stored on the computer server whereas the agricultural vehicle automatically retrieves the tasks from the computer server via the network.

The method can comprise the additional steps of gathering at least a restriction associated with the selected free path segment, checking whether the restriction of the selected free path segment is going to be violated by the agricultural vehicle and selecting another free path segment from the predefined path segments being free from an obstacle in case of a violation of the restriction.

Analogously, the method can comprise the steps of gathering at least a restriction associated with the selected free path segment, checking whether the restriction of the selected free path segment is violated by an implement connected to the agricultural vehicle and selecting another predefined path segments being free from an obstacle in case of a violation of the restriction.

I.e. the restriction decides whether the agricultural vehicle or the implement is allowed to move to the corresponding path segment or not. For example, the restriction can define a threshold for a maximum weight of the vehicle or the implement as well as a maximum loading, a maximum dimension, a maximum parking time or a maximum speed the vehicle and/or the implement mustn't exceed. The path segment restrictions can also define which tasks are allowed to be executed, e.g. the corresponding path segment is allowed to be used for refilling fuel only or for parking only.

The path segment restrictions can also define in which direction or orientation the corresponding path segment is allowed to be driven, e.g. forward or backward driving only.

The restriction can also define whether parking is allowed at a path segment and if so, what type of vehicle or implement is allowed or prohibited for parking.

The restrictions can also define by which type of vehicle or by which type of implement (e.g. tractors only) the corresponding path segment is allowed to be used or which type of vehicle or implement is excluded from the usage of the path segment (e.g. all vehicles or implements except transport wagons).

Other and additional restrictions are possible and the restrictions can be changed at every time.

The restrictions can be stored on a memory of the agricultural vehicle or any other unit (i.e. the computer server or another vehicle) being part of the network. The agricultural can receive the restrictions from any unit connected with the network.

The ECU of the agricultural vehicle can check if any restriction is going to be violated by the agricultural vehicle or the implement. Alternatively, the computer server performs the check and sends a notice of allowance to the ECU of the vehicle.

If any restriction of the selected path segment is violated by the agricultural vehicle or the implement, the method will not calculate a path from the position of the agricultural vehicle to the selected free path segment. Instead, the method searches for another free predefined path segment meeting all restrictions and selects this free path segment as new selected path segment.

The selected path segment can be located in a garage on the farmyard for parking a vehicle or an implement in it. The garage can be closed by a gate, whereas the computer server controls the gate. To automatize a parking process for the vehicle or the implement, the method can comprise the step of opening the gate of a garage, if the selected free path segment is located in the garage and the gate of the garage is closed. Thus, an agricultural vehicle arriving at the garage can immediately drive into it and does not need to wait until the gate has opened.

After the vehicle or the implement was parked at the selected path segment, the ECU of the agricultural causes to update the computer server that the selected path segment is blocked or occupied. Additionally, the information of the occupied path segment can be sent to any other unit being connected with the network. The computer server receiving the update detects that the path segment is located in the garage. Thereupon the computer server closes automatically the gate.

The method can comprise the steps of determining a forward or a rearward parking direction for parking the agricultural vehicle or an implement connected to the agricultural vehicle at the selected free path segment, calculating a path to drive forwards to the selected free path segment in case of a forward parking direction or calculating a different path to drive backwards to the selected free path segment in case of a rearward parking direction.

The decision whether the agricultural vehicle or the implement shall be parked forwards or rearwards can be taken manually by an operator or can be taken based on rules. A rule based decision can be taken by the ECU executing the steps of determining a forward parking direction if the implement to be parked is connected at the front of the agricultural vehicle and determining a rearward parking direction if the implement to be parked is connected at the back of the agricultural vehicle. Then, the vehicle can move autonomously to the selected path segment, decouple the implement at the selected path segment and go away from the implement without being blocked by the decoupled implement.

The path to drive forwards in the selected free path segment and the path to drive backwards in the selected free path segment can differ in that one of the both paths requires a change of the driving direction of the agricultural vehicle. I.e. one of the paths guides the agricultural vehicle directly to the selected path segment, whereas the other path requires an additional turning manoeuver to switch from a forward movement to a backward movement or vice versa. For example, a vehicle driving forwards on the farmyard may need a turning manoeuver to reverse thereupon into the garage. Thus, if there is not enough space on the farmyard for such a turning manoeuver of the vehicle, the method would calculate a path to guide the vehicle directly to the selected path segment.

Preferably, the method comprises the steps of moving the agricultural vehicle to the selected free path segment, parking the implement at the selected free path segment, decoupling the implement from the agricultural vehicle and defining the selected free path segment as a path segment occupied by an obstacle. Thus, this path segment is excluded to be selected as a free path segment again to park another vehicle or implement until the implement is removed from this path segment. Thus, a collision with the implement parking at this path segment can be avoided.

Analogously as described before, after the implement was parked at the selected path segment and decoupled from the vehicle, the ECU of the agricultural vehicle causes to update the computer server that the selected path segment is blocked or occupied by sending a corresponding information. Additionally, the information of the occupied path segment can be sent to any other unit being connected with the network.

But, if the task comprises a command to couple the agricultural vehicle with the implement parking at the path segment, then the method would allow to select the path segment occupied by the implement and to calculate a path to guide the agricultural vehicle to the path segment.

Preferably, the method comprises the steps of determining the height of a hitch of the agricultural vehicle when the implement is decoupled from the hitch and saving the information of the height of a hitch. The information can be stored to the computer server in association with the corresponding path segment. If the implement shall be connected to an agricultural vehicle at a later time, the information of the hitch height can be retrieved by the agricultural vehicle to adjust automatically its hitch according to the information. Together with the information of the path segment the implement is parking, the coupling process can be automatized completely, so that the vehicle calculates a path to the path segment, moves autonomously to the implement located at the path segment and couples autonomously the implement to the hitch.

In case of multiple vehicles operating at the farmyard, two or more vehicles could select the same free path segment. On the one hand, such a situation could cause a collision between the two vehicles. On the other hand, a first vehicle having selected the free path segment prior to a second vehicle could arrive at the path segment at a later time than the second vehicle. So, the path segment can be occupied by the second vehicle although the first vehicle selected the free path segment first. To avoid both situations, the method comprises preferably the step of reserving the selected free path segment for an agricultural vehicle to avoid a selection of the free path segment by another vehicle. Then, if a first vehicle selected and reserved a free path segment, a second vehicle is excluded to select the same free path segment.

The reservation of the free path segment can be restricted. E.g. the reservation can be limited to a defined time interval or the number of reservations per vehicle can be limited, e.g. two path segments per vehicle at most.

BRIEF DESCRIPTION OF THE DRAWINGS

The invention will now be described, by way of example only, with reference to the accompanying drawings in which:

FIG. 4 schematically represents an agricultural vehicle with an implement attached to.

DETAILED DESCRIPTION OF SPECIFIC EMBODIMENTS OF THE INVENTION

Figure 1:
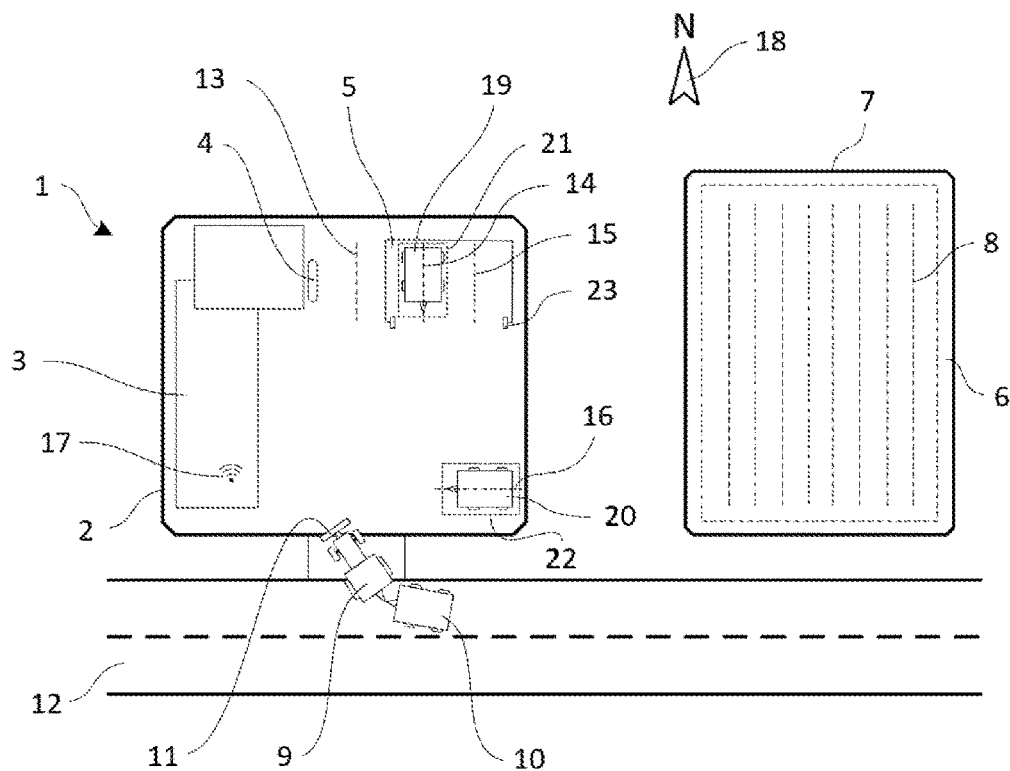
FIG. 1 schematically represents an agricultural field, a farmyard and an agricultural vehicle entering the farmyard.

FIG. 1 shows a farmyard 1 localized by its farmyard boundary 2. On the farmyard there are several facilities as a building 3, a service station 4 and a garage 5.

Next to the farmyard 1, an agricultural field 6 is localized by its field boundary 7. For this field 6, a headland and several field paths 8 can be defined. The information of the headland and the field paths 8 can be stored on a computer server (not shown) located in one of the facilities, e.g. in building 3.

The computer server is connected with several equipment of the facilities and can control them, e.g. to automatically open or close a gate 23 of the garage 5. The computer server can also be connected to a camera system (not shown) to surveil the farmyard 1. The computer server is also connected to a wireless communication unit 17.

Figure 4:
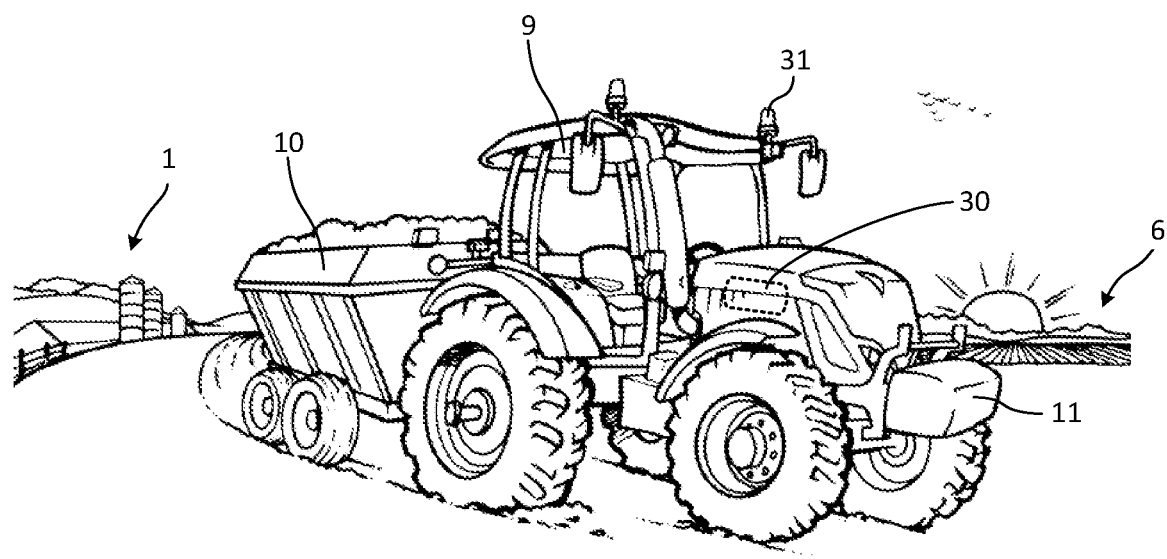

An agricultural vehicle 9, e.g. a tractor, to which a first agricultural implement 10, e.g. a transport wagon, and a second agricultural implement 11, e.g. a front weight, are connected with, drives along a road 12 (as can also be seen in FIG. 4). The first implement 10 is towed by the vehicle 9 and can be loaded with crop harvested from the agricultural field 6. The second implement 11 is carried by the vehicle 9 at a front side of the vehicle 9.

The vehicle 9 comprises also a wireless communication unit 31 for a bidirectional data transfer with the computer server connected with the communication unit 17.

The crop of the field 6 could be harvested autonomously whilst the vehicle 9 was guided along the field paths 8.

Preferably the vehicle 9 is equipped with a position tracking system, e.g. using a global navigation satellite system (GNSS) as GPS, GLONASS, etc., that detects any deviations between the field path 8 and the current position of the vehicle 9 driving along the field path 8 and commands correction actions, e.g. automatic steering actions to hold the vehicle 9 exactly on the field path 8. Such systems are well known as vehicle guidance systems.

According to this invention, there are several path segments 13 to 16 defined within the farmyard boundary 2. The path segments 13 to 16 are similar to the field paths 8 and describe a position information the vehicle 9 can be guided along. The path segments 13 to 16 can be of any length, orientation and shape, e.g. straight or curved. The path segments 13 to 16 can be planned manually and be stored on the computer server. As described later, the path segments can be transferred to the vehicle 9.

As shown in FIG. 1, the path segments 13 to 16 are unconnected or separate from each other. The path segments have approximately a length of the vehicle 9 or the implement 10 or both together. A first path segment 13 is located next to the service station 4, a second and third path segment 14 and 15 within the garage 5 and a forth path segment 16 at the south-east side of the farmyard boundary 2 (see north arrow 18).

Additional path segments (not shown) can be defined and stored. The path segments describe preferred positions or locations for parking, loading/filling or unloading of the vehicle 9 or one of the implements. The path segments can also describe preferred positions or locations the vehicle 9 often needs to be guided along or positions or locations that are difficult to be arrived manually, e.g. to avoid collisions between a wall of a building and the vehicle 9 or a connected implement 10 or 11.

If the autonomous crop process has finished, the vehicle 9 can transport the harvested crop from the field 6 to the farmyard 1. Then, at the farmyard 1, further tasks need to be completed, e.g. position the first implement 10 to a crop unloading location, decouple the first or the second implement 10 or 11, fill the vehicle with fuel or other operating resources or park the vehicle or the implement at a free parking lot.

According to this invention, these and other tasks shall be performable autonomously by the vehicle 9 to improve the automatization process at the farmyard 1 (in addition to field process automatization).

Figure 2:
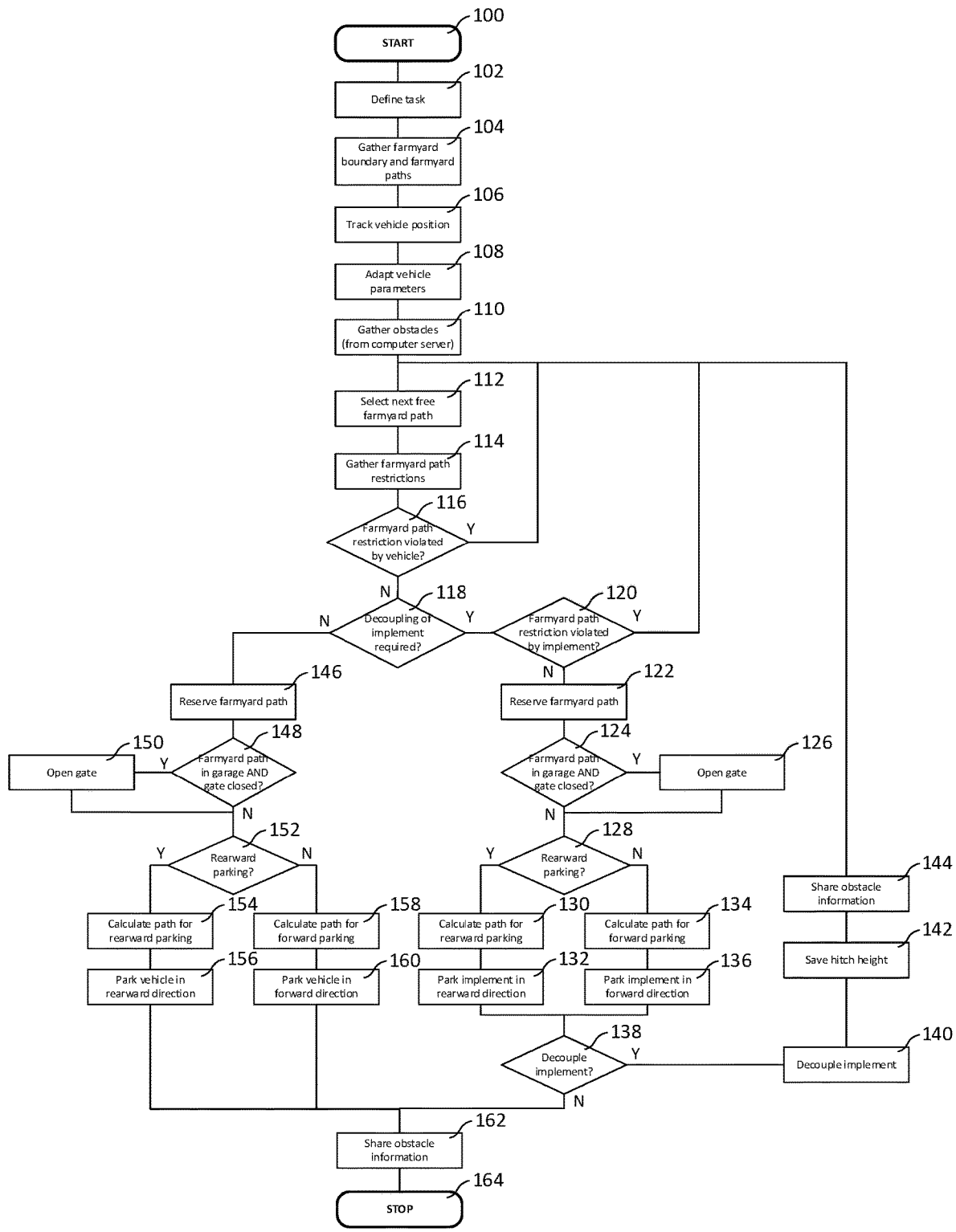
FIG. 2 shows a flow diagram for a method according to the invention.

FIG. 2 shows a flowchart of the automated process starting with step 100. The process is implemented in a computer program product which is executable by an electronic control unit 30 (ECU) of the vehicle 9 (see FIG. 4) or by the ECU of the computer server or both ECUs. Step 100 can be initialized at any time.

At step 102 a task to be performed by the vehicle 9 and its first and second implements 10 and 11 is defined. Generally all functions of the vehicle 9 and the implements 10 and 11 can be considered to define a task. The task can be defined by an operator and recorded by the ECU of the vehicle 9.

For the further description of the invention, it is assumed that the following operations are defined as a task comprising three commands a) to c): Vehicle 9 shall a) park the first implement 10 on the farmyard 1, b) decouple the first implement 10 from the vehicle 9 and c) be refilled with fuel.

Then, at step 104, the farmyard boundary 2 and all path segments 13 to 16 are gathered by the vehicle 9. The farmyard boundary 2 and the path segments 13 to 16 could be prepared by an operator and be stored on the computer server (as described above). The information of the farmyard boundary 2 and the path segments 13 to 16 can be transferred from the computer server to the ECU 30 of the vehicle 9 via two wireless communication units 17 and 31. Alternatively the information can be transferred using other data exchange devices as USB memory sticks, etc.

The vehicle position tracking system tracks continuously the position of the vehicle 9 (step 106). Preferably, the vehicle position tracking system is the same as used for the path guidance operation in the field 6, e.g. using a GNSS. The vehicle position tracking system detects when the vehicle 9 arrives at the farmyard 1.

The method continues with the next step 108, preferably when the vehicle 9 is close enough to the farmyard boundary 2, e.g. when the vehicle 9 leaves the road 12 and turns to the farmyard 1. Then, the ECU 30 of the vehicle 9 adapts some vehicle parameters according to a predefined set of farmyard parameters to improve the safety while operating within the farmyard boundary 2. E.g. the maximum possible vehicle speed can be limited to a reduced value, the operating speed of the hitch or the implements connected to the hitch can be limited to a reduced value, the maximum pressure of the hydraulics to control the implement can be limited to a reduced value, etc.

At step 110, the vehicle 9 gathers all obstacles located within the farmyard boundary 2. The information of the locations of all obstacles can be stored on the computer server and transferred to the vehicle 9 via the wireless communication units 17 and 31. The farmyard can be surveilled by the camera system (not shown) to detect all obstacles within the farmyard boundary 2 and to send the information to the computer server, so that the information of all obstacles on the computer server is always up to date. Additionally, the vehicle 9 can be equipped with a sensor, e.g. a 3D-camera, to detect obstacles and their locations relative to the vehicle. The vehicle can send the information of the detected obstacles (together with the position of the vehicle) to the computer server via the wireless communication units 17 and 31 or to any other vehicle. Based on the data received, the computer server can determine the locations of the obstacles at the farmyard and store the data to share them with other vehicles.

Several objects can be acknowledged or defined as obstacles. E.g. all facilities 3, 4 and 5 on the farmyard 1 are obstacles. Also equipment as a third implement 19 located in the garage 5 or a forth implement 20 located at the forth path segment 16 are treated as an obstacle. The dimensions of the obstacles can be stored on the computer server to define an obstacle boundary for each obstacle, e.g. an obstacle boundary 21 for the third implement 19 and an additional obstacle boundary 22 for the forth implement 20.

Considering the information of all obstacles 3, 4, 5, 19, 20, the ECU 30 of the vehicle 9 can calculate a path from an arbitrary start point to an arbitrary end point so that a collision between an obstacle and the vehicle 9 or the first and second implements 10, 11 connected with the vehicle 9 is avoided, as described later (see steps 130, 134, 154, 158).

With the following step 112, the ECU 30 of the vehicle 9 checks successively all path segments 13 to 16, which of them is not blocked by an obstacle and can be used by the vehicle 9 or its connected first and second implements 10 and 11 without colliding with an obstacle. According to the configuration of FIG. 1, the ECU 30 would detect that the second path segment 14 is blocked by the third implement 19 and the forth path segment 16 is blocked by the forth implement 20, but that the first and the third path segments 13 and 15 are free.

The information of blocked and unblocked path segments can also be stored on the computer server and shared to the ECU 30 of the vehicle 9 via the wireless communication units 17 and 31.

For the further description of the invention, it is assumed that the ECU 30 of vehicle 9 selects primarily the first path segment 13 as the next free path segment, whereas in an alternative approach the ECU 30 could decide to select the third path segment 15 as the next path segment.

At step 114, the vehicle 9 gathers all restrictions of the selected path segment. The restrictions of each path segment can be predefined and stored in the ECU 30 of the vehicle 9 or the vehicle 9 can receive this information from the computer server via the wireless communication units 17 and 31. The restrictions for each path segment can be defined as a set of data defining the allowed usage of the corresponding path segment. E.g. for each path segment 13 to 16 the maximum weight, loading, dimensions and speed of the vehicle and the implement can be defined. The path segment restrictions can also define by which type of vehicle (e.g. tractors only) or by which type of implements (e.g. not implement 11 or 20) the corresponding path segment is allowed to be used. The path segment restrictions can also define for which purpose the corresponding path segment is allowed to be used, e.g. for refilling fuel only or for parking only. The path segment restrictions can also define in which direction or orientation the corresponding path segment is allowed to be used, e.g. forward driving only. Other and additional restrictions are possible and the restrictions can be changed at every time.

For the further description of the invention, it is assumed that the restriction of the first path segment 13 prohibits to be used by any transport wagon and allows to use the first path segment 13 only, if a vehicle shall be refilled with fuel. The third path segment 15 is not restricted.

The method continues with step 116 and checks, whether a restriction of the selected free path segment is violated by the vehicle 9. As already mentioned, it is assumed that the first path segment 13 is selected as the next free path segment.

If vehicle 9 would violate a restriction of the first path segment 13, the method would jump back to step 112 to select another free path segment, e.g. the third path segment 15.

In this case, the vehicle 9 does not violate a restriction of the first path segment 13, because the task defined at step 102 requires to refill the vehicle 9 with fuel (see description above) and the restriction of the first path segment 13 allows refilling of vehicles with fuel.

Since no violation of the restriction of the selected first path segment 13 could be detected, the method continues with the following step 118 and checks, whether it is required to decouple an implement from to the vehicle.

If it is not required to decouple an implement from the vehicle 9, the method would proceed with step 146.

In this case, the task defined at step 102 requires to decouple the first implement 10 from the vehicle 9.

Because decoupling of an implement is required, the method proceeds with step 120 and checks, whether a restriction of the selected free path segment is violated by one of the implements 10 and 11 connected with the vehicle 9. As already mentioned, it is assumed that the first path segment 13 is selected as the next free path segment.

If no violation of the restriction of the first path segment 13 would be detected, the method would continue with step 122.

In this case, the implement 10 violates a restriction of the first path segment 13, because the implement 10 is a transport wagon. As assumed at step 114 before, the restriction of the first path segment 13 prohibits that a transport wagon uses the first path segment 13.

Because of the violation of a restriction of the first path segment 13, the method jumps back to step 112 to select another free path segment. In the configuration of FIG. 1, the third path segment will be selected as the next free path segment 15.

As assumed at step 114, the third path segment 15 has no restrictions; so no path segment restriction is violated at step 116. But decoupling of the implement 10 has not been completed so the method steps forward to step 120 again.

Now, no violation of a restriction of the selected third path segment 15 by the first or the second implement 10 or 11 will be detected, because there are no restrictions defined for the third path segment 15.

Since no violation of the restriction of the selected third path segment 13 could be detected, the method continues with the following step 122.

At step 122, the selected path segment will be reserved to prevent other vehicles to use this path segment. The ECU 30 of the vehicle 9 sends a corresponding information to the computer server via the wireless communication units 17 and 31. The computer server can define a corresponding restriction (e.g. third path segment 13 allowed for vehicle 9 only) and link this restriction with the selected third path segment 15. Then, the reservation in the form of a restriction can be received by all other vehicles communicating with the computer server.

The method continues with step 124 and checks whether the selected path segment is located in the garage 5 and whether the gate 23 of the garage 5 is closed.

If both conditions are fulfilled, the vehicle 9 or the first or second implement 10 or 11 would be hindered to use the selected third path segment 15. In this case, the computer server detects the required access to the third path segment 13 based on the received reservation from step 122 and the closed status of the gate 23 based on a feedback signal from the gate 23 itself.

Then, the method continues with step 126 and the computer server automatically commands the garage 5 to open the gate 23.

After step 126, or if one condition of step 124 is not fulfilled, the method proceeds to step 128 and checks whether the connected implement shall be parked rearward. The decision can be taken based on a rule implemented in the ECU 30 of the vehicle 9: All implements to be towed by a vehicle such as a transport wagon shall be parked rearward only. All implements connected at a front side of a vehicle shall be parked forward only.

Other or additional rules are possible. All rules can be transferred to and received from the computer server and the vehicle 9 via the wireless communication units 17 and 31. According to the task defined in step 102, the first implement 10 shall be parked. Since the first implement 10 is a towed transport wagon (see FIG. 1 or 4), the method proceeds with step 130.

At step 130, the ECU 30 of the vehicle 9 calculates a path form the current positon of the vehicle 9 to the selected third path segment 15 for parking autonomously the first implement 10 in the garage 5 in rearward direction without colliding with any obstacles 3, 4, 5, 19 or 20.

Figure 3:
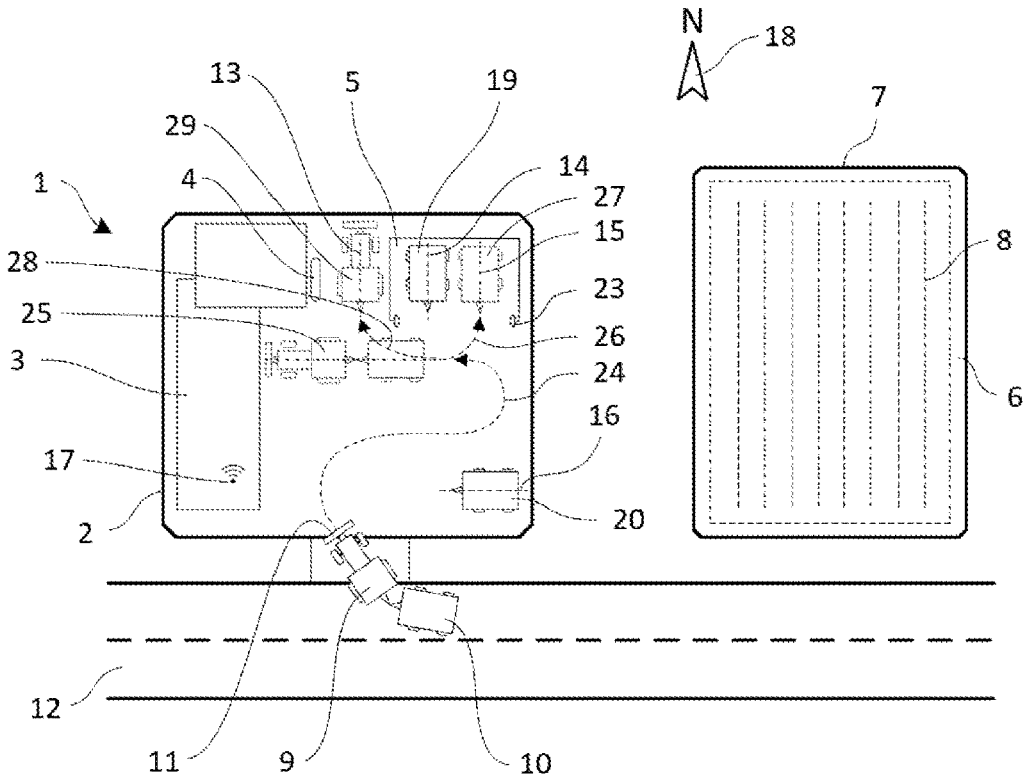
FIG. 3 schematically represents an agricultural field, a farmyard and an agricultural vehicle entering the farmyard.

The result is shown in FIG. 3: The ECU 30 of the vehicle 9 calculates a first intermediate path 24 that leads the vehicle 9 with its connected first and second implements 10 and 11 from the current position to an intermediate position 25 that brings the vehicle 9 in a comfortable position to reverse the first implement 10 into the garage 5. The first intermediate path 24 has an S-curved shape that includes all steering maneuvers for the vehicle 9 to reach the intermediate position with enough distance to implement 20 or the gate 23 to avoid a collision.

Proceeding from the intermediate position 25, the ECU 30 of the vehicle 9 calculates a second intermediate path 26 to connect the first intermediate path 24 with the selected third path segment 15. Hence, the ECU 30 of the vehicle 9 calculated a closed path (combining the first and second intermediate paths 24 and 26 and the selected third path segment 15) to guide the vehicle 9 from the current position to a position for parking the first implement 10 in the garage at the free path segment 15.

Then, the method continues with step 132. The vehicle 9 moves autonomously in forward direction along the first intermediate path 24 until the intermediate position 25 is arrived. The vehicle 9 stops at the intermediate position 25. Then, the vehicle 9 reverses along the second intermediate path 26 and the selected third path segment 15 so far needed to push the first implement 10 into the garage 5. The vehicle 9 stops before the first implement 10 collides against the garage 5. As shown in FIG. 3, the first implement 10 arrived its final position 27.

If, at step 128, the method had decided that forward parking is required, the method would proceed with the steps 134 and 136 to calculate a path for forward parking of the implement and to move the vehicle along the calculated path to park the implement in forward direction (useful for example in case of parking the second implement 11). Step 134 can be executed analogously to step 130 and step 136 can be executed analogously to step 136.

After step 132 or 136, the method proceeds with step 138 to decide whether the implement shall be decoupled from the vehicle.

If not, the parking process is deemed to be finished. The method proceeds to step 162 to define the parked vehicle and its connected implements as an obstacle and to update the computer server with the new obstacle information. The ECU 30 of the vehicle sends the final positions of the vehicle itself and of the connected implements to the computer server via the wireless communication units 17 and 31.

Additionally, the computer server can define a corresponding restriction (e.g. third path segment blocked by implement 10) and link this restriction with the third path segment 15. Then, the restriction can be shared with all other vehicles communicating with the computer server.

After step 162 the method ends with step 164.

If the implement shall be decoupled from the vehicle, what is intended to do according to the task defined in step 102, the method proceeds after step 138 with step 140. The vehicle 9 decouples the first implement 10 automatically.

The method proceeds with step 142. At the moment the first implement 10 is disconnected from the vehicle 9, the ECU 30 of the vehicle 9 saves the height of the hitch. Additionally, this information can be transferred via the wireless communication units 17 and 31 to the computer server to share this information to other vehicles communicating with the computer server. If the vehicle 9 shall be reconnected with the first implement 10 at a later time, the vehicle 9 can receive the saved height information and adjust the hitch height according to the saved value to couple with the first implement 10 automatically.

At the next step 144, the first implement 10 is defined as an obstacle. Analogous to step 162, the computer server is updated with the new obstacle information and a corresponding restriction for the third path segment 15 is created.

Then the method skips back to step 112.

After the first implement 10 was parked at the third path segment 15, the first path segment is selected as the next free path segment.

At step 114, the ECU 30 of the vehicle 9 receives the farmyard restrictions again. In the meanwhile, the farmyard restrictions could be updated, e.g. that the third path segment 15 is blocked by the first implement 10.

The method continues with step 116 and checks, whether a restriction of the selected free path segment is violated by the vehicle 9. As already mentioned, it is assumed that the first path segment 13 is selected as the next free path segment.

Since no restriction is violated because the second implement 11 is not a transport wagon and the vehicle 9 shall be refilled with fuel, the method proceeds with step 118 (see assumed restrictions for the first path segment 13 from step 114 above).

Since a decoupling of the second implement 11 is not intended according to the task defined in step 102, the method continues with step 146.

At step 146, the selected first path segment 13 will be reserved to prevent other vehicles to use this path segment analogous to step 122.

At step 148, the method checks whether the selected path segment is located in the garage 5 and whether the gate 23 of the garage 5 is closed analogous to step 124.

If so, the gate 23 will be opened at step 150 analogous to step 126.

The method proceeds with step 152 and checks whether the vehicle 9 shall be parked rearward analogous to step 128. Since no rule defined at step 128 fits to the vehicle 9 because the vehicle 9 shall be parked instead of the second implement 11, the ECU 30 of the vehicle 9 can decide on its own. Preferably, the ECU 30 of the vehicle takes the decision based on the side the fuel tank cap is located at the vehicle 9. E.g. in this case, the fuel tank cap is at the left side of the vehicle 9 (not shown). So it is easier to refill the vehicle 9 with fuel at the service station 4, if the vehicle 9 would park in forward direction at the first path segment 13. Thus the ECU 30 of the vehicle 9 decides not for rearward parking at step 152.

The method proceeds to step 158. Analogous to step 130 or 134, the ECU 30 of the vehicle 9 calculates a path form the current positon of the vehicle 9 at the third path segment 15 respectively the second intermediate path 26 to the selected first path segment 13 for autonomously parking the vehicle 9 in forward direction without colliding with any obstacles 3, 4, 5, 19 or 20.

The result is shown in FIG. 3: The ECU 30 of the vehicle 9 calculates a third intermediate path 28 that leads the vehicle 9 with its connected second implement 11 from the third path segment respectively the second intermediate path 26 to a final position 29. Hence, the ECU 30 of the vehicle 9 calculates a closed path (combining the third intermediate path 28 with the selected first path segment 13) that includes all steering maneuvers for the vehicle 9 to reach the final position 29 with enough distance to the third implement 19 and the gate 23 to avoid a collision.

Then, the method continues with step 160. The vehicle 9 moves autonomously in forward direction along the third intermediate path 28 until the final position 29 is arrived and stops.

In a preferred embodiment of the invention, the service station 4 comprises a robotic fuel nozzle to refill automatically the vehicle 9 with fuel. Such systems are well known from the prior art.

If, at step 152, the method had decided that rearward parking is required, the method would proceed with the steps 154 and 156 to calculate a path for rearward parking of the vehicle and to move the vehicle along the calculated path to park the vehicle in rearward direction. Step 154 can be executed analogously to the step 130 or 158; step 156 can be executed analogously to step 132 or 160.

After step 152 or 160, the method proceeds with step 162 that was already described above.

In a preferred embodiment of the invention, the computer server closes automatically the gate 23 of the garage 5. The camera system surveilling the farmyard 1 can check whether a closing gate would collide against an obstacle. If not, the camera system can trigger the computer server to close the gate 23, otherwise to hold the gate 23 open until the obstacle was removed.

In a preferred embodiment of the invention, the ECU 30 of the vehicle 9 calculates a path to couple automatically to an implement. E.g., after the vehicle 9 is refilled with fuel at the service station 4, the ECU 30 of the vehicle 9 can calculate a path to couple automatically with an implement parking at the farmyard 1, e.g. the forth implement 20. The vehicle 9 can receive the position and the orientation of the forth implement 20 (as well as other information needed for the coupling process) from the computer server via the wireless communication units 17 and 31. Analogous to the path calculation steps described above (see steps 130, 134, 154, 158), the ECU 30 calculates an intermediate path connecting the first path segment 13 with the forth path segment 16. Afterwards, the vehicle 9 can drive autonomously along the calculated path to the forth implement 20. Preferably, the hitch height needed to couple the implement 20 with the vehicle 9 was stored on the computer server after the previous decoupling process analogous as described for step 140 and 142. Then, the vehicle 9 can receive the hitch height needed to couple to the implement 20 via the wireless communication units 17 and 31 and adapt automatically the hitch height correspondingly. The vehicle 9 couples automatically to the forth implement 20 and tows the forth implement 20 away from the forth path segment 16, for example to go back to the field 6. When the forth path segment 16 is free again, this state can be detected by the camera system to inform the computer server that the path segment restrictions can be updated accordingly to indicate the availability of the forth path segment 16.

LIST OF REFERENCE NUMERALS

1 Farmyard
2 Farmyard boundary
3 Building
4 Service Station
5 Garage
6 Field
7 Field boundary
8 Field path
9 Vehicle
10 First implement
11 Second implement
12 Road
13 First path segment
14 Second path segment
15 Third path segment 16 Forth path segment
17 Wireless communication unit
18 North arrow
19 Third implement
20 Forth implement
21 Obstacle boundary
22 Obstacle boundary
23 Gate
24 First intermediate path
25 Intermediate position
26 Second intermediate path
27 Final position
28 Third intermediate path
29 Final position
30 Electronic control unit/ECU
31 Wireless communication unit

The invention claimed is:

1. A method for automatically maneuvering an agricultural vehicle to at least a predefined path segment, comprising:
gathering a plurality of predefined path segments, wherein each of the path segments of the plurality of path segments is unconnected to the others of the plurality of path segments;
determining which of the plurality of predefined path segments are free from an obstacle;
selecting a free path segment from the plurality of predefined path segments being free from an obstacle; and
calculating a path from the position of the agricultural vehicle to the selected free path segment.

2. The method of claim 1, further comprising:
defining a task to be executed at the selected free path segment, whereas the task comprises at least a command to park the agricultural vehicle, to park an implement connected to the agricultural vehicle or to refill the agricultural vehicle with energy or supplies.

3. The method of claim 1, further comprising:
gathering at least a restriction associated with the selected free path segment;
checking whether the restriction of the selected free path segment is going to be violated by the agricultural vehicle; and
selecting another free path segment from the plurality of predefined path segments being free from an obstacle in case of a violation of the restriction.

4. The method of claim 1, comprising the steps:
gathering at least a restriction associated with the selected free path segment;
checking whether the restriction of the selected free path segment is violated by an implement connected to the agricultural vehicle; and
selecting another predefined path segment being free from an obstacle in case of a violation of the restriction.

5. The method of claim 3, wherein the restriction defines a driving direction for the selected free path segment to be driven by the agricultural vehicle.

6. The method of claim 3, wherein the restriction defines a prohibition for parking the agricultural vehicle or an implement connected to the agricultural vehicle at the selected free path segment.

7. The method of claim 3, wherein the restriction defines the type of vehicle or type of implement to be allowed to move along the selected free path segment.

8. The method of claim 1, further comprising:
opening a gate of a garage, if the selected free path segment is located in the garage and the gate of the garage is closed.

9. The method of claim 1, further comprising:
determining a forward or a rearward parking direction for parking the agricultural vehicle or an implement connected to the agricultural vehicle at the selected free path segment;
calculating a path to drive forwards to the selected free path segment in case of a forward parking direction; or
calculating a different path to drive backwards to the selected free path segment in case of a rearward parking direction.

10. The method of claim 9, wherein only one of the both paths to the selected free path segment requires a change of the driving direction of the agricultural vehicle.

11. The method of claim 9, further comprising:
determining a forward parking direction if the implement to be parked is connected at the front of the agricultural vehicle; and
determining a rearward parking direction if the implement to be parked is connected at the back of the agricultural vehicle.

12. The method of claim 9, further comprising:
moving the agricultural vehicle to the selected free path segment;
parking the implement at the selected free path segment;
decoupling the implement from the agricultural vehicle; and
defining the selected free path segment as a path segment occupied by an obstacle.

13. The method of claim 12, further comprising:
determining the height of a hitch of the agricultural vehicle when the implement is decoupled from the hitch; and
saving the information of the height of a hitch.

14. The method of claim 1, further comprising:
reserving the selected free path segment for the agricultural vehicle to avoid a selection of the free path segment by another vehicle.

15. A data processing system comprising at least a means for carrying out the method according to claim 1.

* * * * *